UNITED STATES PATENT OFFICE.

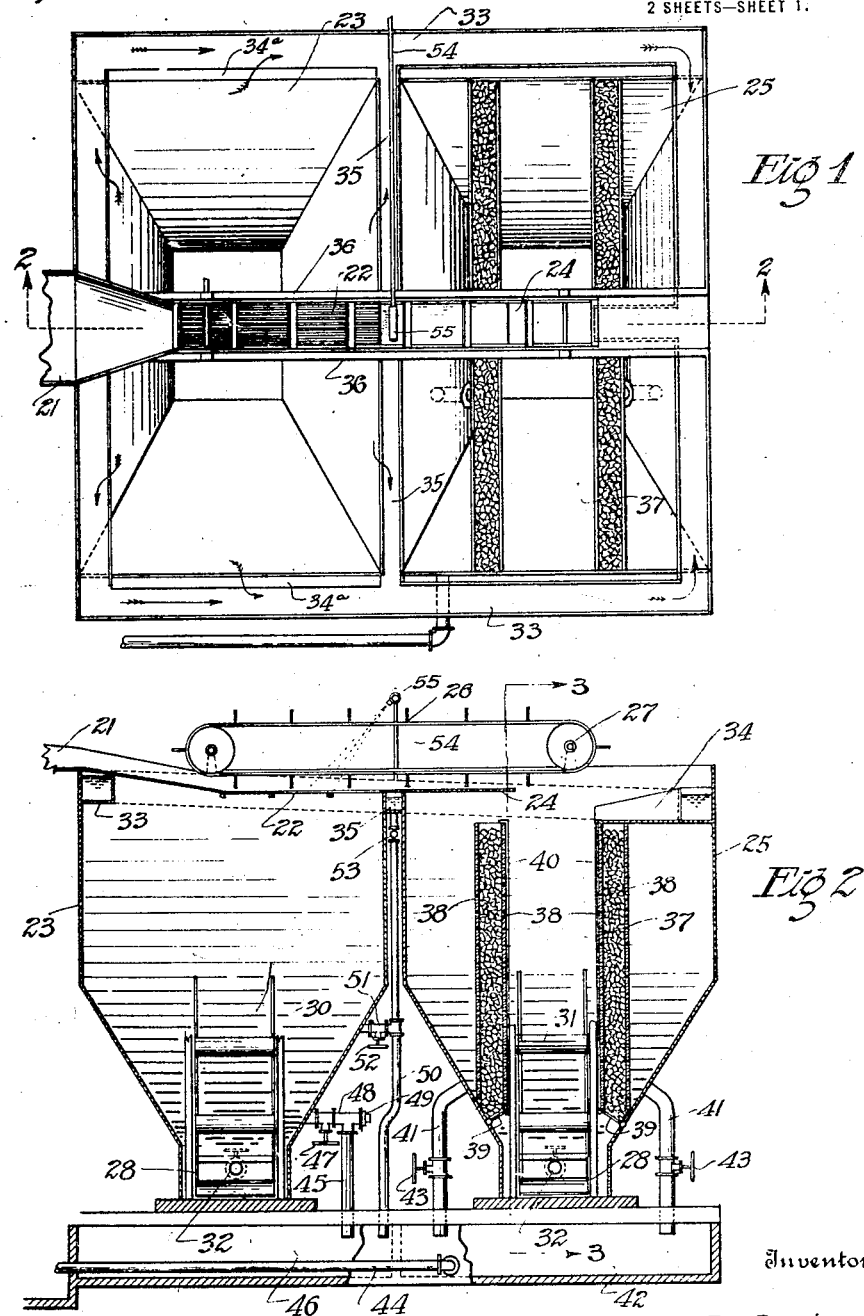
E. G. BURKS & N. HAYES.
SETTLING APPARATUS FOR COAL WASHINGS.
APPLICATION FILED JAN. 26, 1916. RENEWED APR. 25, 1918.
1,284,586.
Patented Nov. 12, 1918.

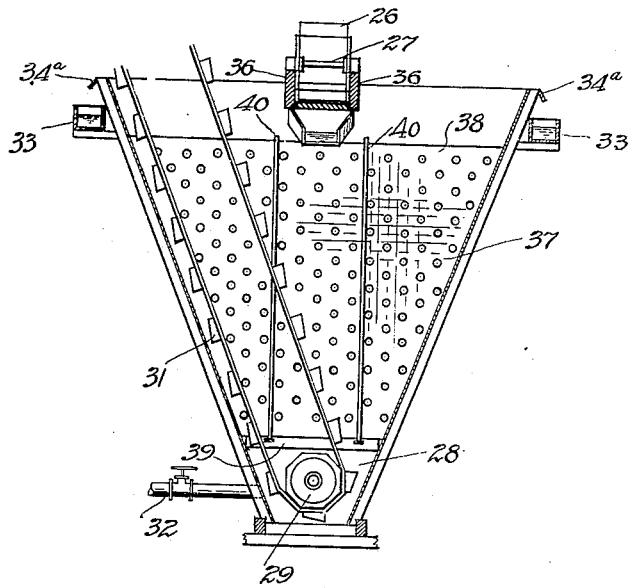
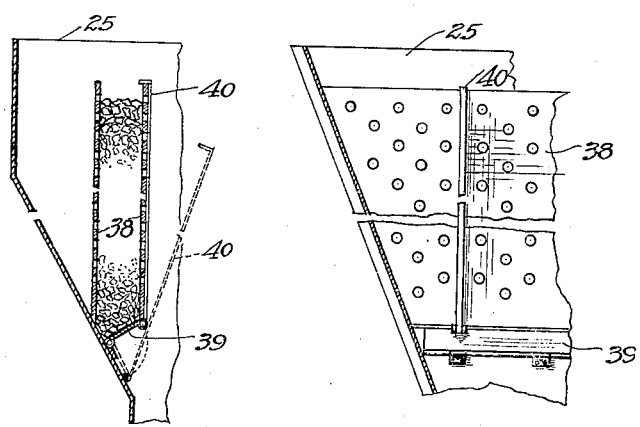

EUGENE G. BURKS AND NEENIAN HAYES, OF ENSLEY, ALABAMA.

SETTLING APPARATUS FOR COAL-WASHINGS.

1,284,586. Specification of Letters Patent. Patented Nov. 12, 1918.

Continuation in part of application Serial No. 45,705, filed August 16, 1915. This application filed January 26, 1916, Serial No. 74,457. Renewed April 25, 1918. Serial No. 230,842.

*To all whom it may concern:*

Be it known that we, EUGENE G. BURKS and NEENIAN HAYES, citizens of the United States of America, residing at Ensley, in the county of Jefferson and State of Alabama, have invented certain new and useful Improvements in Settling Apparatus for Coal-Washings, of which the following is a specification.

Our invention relates to a settling tank apparatus for treating the overflow water from the jigs in order to purify the latter and return it for use in the jig tank.

It is characteristic of our invention that at least two settling tanks should be provided in combination with an apparatus designed to carry the fine coal and the overflow water from the jig into one tank and to deliver the lump coal into the other tank or tanks, means being provided for causing the overflow of water from the first mentioned tank into the other tanks with the lump coal. Each lump coal tank is provided with a filtering compartment which surrounds the elevator for such tank and is so disposed as to receive both the lump coal and the overflow water from the first mentioned tank and is adapted to filter such water before it is returned therefrom to the jig. This apparatus, broadly considered, is disclosed in our pending application, filed August 16th, 1915, Serial No. 45,705, and so far as the same may consistently be, it is claimed therein. The distinctive features which it is our purpose to protect in this application, which forms a continuation of our said application, relate to the structure of the settling tanks and to the novel construction and arrangement of the filtering apparatus for the lump coal settling tanks.

It is important in the treatment of the coal and water in this apparatus that the agitation of the water in the primary or fine coal settling tank should be reduced to a minimum and moreover that so far as possible any substantial accumulation of sedimentary coal in the bottom of any of the settling tanks should be avoided inasmuch as this necessitates the frequent cleaning out of the tanks and interrupts their use. To this end we have discovered that if the bottom of a settling tank is given a hopper shape so as to converge toward a narrow deep well which is proportioned to just clear the sides and outer lip of the elevator buckets during their passage therethrough, the collection of sediment in the bottom of the tank will be prevented as the latter will work down into this well and be carried out by the elevator. This structural arrangement is of especial importance where the elevator buckets are given a slow movement to avoid agitation and which therefore would permit under normal arrangements an excessive deposit of sediment in the tank bottom.

One distinctive feature of the filtering apparatus in the lump coal settling tank relates to the formation of the filtering walls by parallel vertical partitions which extend across its bottom on each side of the well therein and dividing the tank into three separate compartments, the center of which receives the elevator and the lump coal together with the overflow from the fine coal settling tank.

Another feature in the provision of bottom doors for the filters which may be dropped so as to discharge the filtering material into the elevator well. As the filtering bed is generally formed by small coal the simplicity in the means thus provided for cleaning the filters and recovering the coal is obvious.

Our invention further comprises the novel details of construction which are hereinafter described in their preferred embodiment and which are set forth in the appended claims, reference being had to the accompanying drawings which form a part of this specification, and in which:—

Figure 1 is a top plan of the two settling tanks with the elevators removed.

Fig. 2 is a vertical sectional elevation on the line 2—2 of Fig. 1.

Fig. 3 is a sectional view on the line 3—3 of Fig. 2.

Figs. 4 and 5 are enlarged detail sectional and elevation views of one of the filters in the lump coal settling tank.

Similar reference numerals refer to similar parts throughout the drawings.

The overflow water and washed coal, both lump and slack, from the jig (not shown) is delivered into a chute 21 which has a screen formed by parallel spaced screen bars 22 in its bottom where it passes over the fine coal setting tank 23. Beyond this tank the chute continues with a solid bottom 24 to a point over the center of a settling tank 25, which we term the lump coal or filtering tank. An endless conveyer 26 is driven by a power shaft 27 and serves to move the coal over the screen 22 and along the chute and to discharge it into tank 25. It will be noted that these two settling tanks have each a hopper bottom, the four walls of which converge toward wells 28 respectively. These wells have pivoted therein lower sprocket wheels 29 for the coal elevators. They are of substantial depth and are designed to fit closely around the lower ends of their respective elevators 30 and 31 which are set down into these wells 28. This construction is more clearly shown in Figs. 2 and 3, where it will be seen that the side walls of the wells hug closely the sides of the elevator buckets and that the elevator buckets in passing around sprocket wheels 29 will swing close to the front and rear inclined walls of the wells. These settling tanks are preferably made deeper than is customary and their elevators are preferably driven at a very slow speed so as to reduce to a minimum the agitation of the water in these tanks. This will, of course, necessitate an increase in the size of the buckets to compensate for the decreased speed. The arrangement of the hopper bottoms and the wells serves to effectively concentrate all settling coal into position to be caught by the elevator buckets and lifted out of the tanks. Each of the settling tanks is provided with a valved clean out pipe 32.

The circulation of the water between the settling tanks and its return from the settling tanks to the jig is provided for in the following maner: A trough 33 passes under the chute 21 and, overhanging inside the left hand end of the tank 23 (Fig. 2), extends through each side of that tank and then at each end takes a right angle turn and extends along each side of both tanks 23 and 25 and then is brought in through the side walls at the right hand end of the tank 25 and leads to a chute 34 which overhangs the central portion of the tank 25. The tank 23 has overflow lips 34ª along each side which direct the water into the side sections of trough 33. A cross trough 35 is provided between the tanks 23 and 25 and opens at each end into the troughs 33. It will thus be seen that the troughs 33 and 35 completely surround the first settling tank 23 so that a uniform overflow therefrom about its entire upper edge is provided for. As indicated in Fig. 2, the adjacent sides of tanks 23 and 25 above trough 35 are cut away for the coal conveyer chute and for the two side bars 36 which extend from end to end over the tanks and support the conveyer and the chute in which it operates.

The large coal settling tank 25 is subdivided by two transverse filtering partitions so as to form a central compartment or filter well 37 in which the elevator 31 works and into which the lump coal is discharged from the chute 24 and the overflow water from the tank 23 through the chute 34. This filter compartment is somewhat analogous to the construction shown in our Letters Patent No. 1,112,976, dated October 6th, 1914, each filter wall being formed by a pair of spaced perforated plates 38 the space between which is filled in with coal to form a granular bed of from 8 to 14 inches in thickness, depending on the filtering capacity required. In our present arrangement the filter is designed to handle a considerable volume of water and it is formed by parallel filter walls extending from side to side of the compartment of the tank and from the top to the bottom of the tank on each side of the well 28 therein. Each filter wall is provided with a movable bottom 39 hinged to its respective outer plate 38 and operable by bars 40 which are hinged to the outer edge of the bottom and extend upwardly so that their hooked upper ends can be caught over the top of the inner filter plate as shown in Fig. 4, in which position the bottom doors are held closed. By releasing these bars so that they move to the dotted position shown in Fig. 4, the bottom walls of the filtering compartments swing down so that the filtering bed is discharged into the well 28. The tank 25 being divided by its two filtering walls into three compartments, it is necessary to provide two outlets for the filtered water which percolates from the central well 37 through the filters into the two outlet compartments of the tank. This we accomplish by means of pipes 41, one of which leads from each end of the tank and discharges into sump 42 below the tank. We provide a valve 43 in each pipe 41 and the water from the sump 42 is conveyed by a pipe 44 by suitable mechanism to the jigging apparatus. The waste water from the lower portion of the tank 23 flows therefrom through a pipe 45 into a sump 46 below it from which it may also be returned by suitable means, if desired, to the jigging apparatus. We provide a valve 47 in the pipe 45 and we also provide a T-fitting 48 having a clean out plug 49. We provide a pipe 50 which opens into the bottom of trough 35 and has a branch connection 51 opening into tank 23 at a point midway between pipe 45 and the trough 35. We provide valves 52 and 53 to control the flow of water through these several pipes. The object in arranging these pipes at different levels is to draw off water with varying percentages of fine coal therein into the sump 46. A supply of fresh water is delivered through a pipe 54 to a spray pipe 55 which discharges against the conveyer 26 near the right hand end of the screen 22, thus serving to wash the lump coal and to more positively direct the fine coal into the tank 23.

In operation, the washed coal and overflow from the jigging apparatus pass down the sluice way 21, the water and fine coal passing into the tank 23 and the lump coal being delivered into the filtering well 37. The fine coal settles in the tank 23 passing down its hopper bottom into its well 28, from which it is lifted by the slow moving elevator 30. The water overflows from the tank 23 on all sides into the troughs which deliver it through the chute 34 into the filtering well 37. The water filters outwardly from this well into the tank 25 while the lump coal and any sediment left in this water is carried off by the elevator 31. To clean the filters the rods 40 are disengaged and lowered, whereupon the filtering bed drops down into the well 28 and is carried off by the elevator. After this the bottom doors 39 are closed and the coal is filled in through the open top into the screening partitions and the apparatus is renewed for service. Water is carried off by the various pipes into the sumps and returned to the desired point of use.

While we have shown only one of the secondary or filtering tanks 25, it is understood that any desired number of these may be used according to the amount of coal washers the apparatus is designed to handle.

Having thus described our invention, what we claim as new and desire to secure by Letters Patent, is:—

1. In a settling apparatus for coal washings, a settling tank having a sloping bottom and a well toward which said bottom slopes, and an elevator apparatus having its lower end projecting down into said well.

2. In a settling apparatus for coal washings, a settling tank having a hopper bottom and a well toward which said bottom slopes, and an elevator working in said well, said well being of substantial depth below the bottom and of a dimension to receive and fit closely about the lower end of said elevator.

3. In a settling apparatus for coal washings, a settling tank subdivided by two spaced vertical partitions into three distinct compartments, each of said partitions comprising spaced foraminous walls and a granular bed, means for delivering coal and dirty water into the intermediate compartment, an elevator working in said compartment, and means to draw out the filtered water from the outside compartments, substantially as described.

4. In a settling apparatus for coal washings, a settling tank having a hopper bottom and a well toward which said bottom slopes, vertical, parallel, water filtering partitions extending from side to side of the tank and disposed on each side of the said well, said partitions extending to the bottom and separating the tank into a central and side compartment, means to direct the coal and dirty water into the central compartment which opens into said well, an elevator projecting downwardly into said well, and means to draw out the filtered water from the outside compartments.

5. In a settling apparatus for coal washings, a settling tank having its bottom formed by four flat walls which slope to the center, a well in said center having sloping end walls formed by a continuation of an opposite pair of said bottom walls and having substantially vertical side walls, and an inclined endless elevator apparatus having its lower end disposed to work in said well which is designed to serve as a boot for the elevator, substantially as described.

6. In a settling apparatus for coal washings, a settling tank having a plurality of spaced parallel vertical filtering partitions extending from side to side thereof, each of said partitions being formed by inner and outer foraminous walls, a granular filtering bed between each pair of walls, means to draw off the filtered water from the outer side of said partitions, means to deliver the coal and dirty water between said partitions, and an elevator for the coal.

7. In a settling apparatus for coal washings, a settling tank, a filtering partition dividing said tank into a plurality of compartments, said partition comprising foraminous inner and outer walls, a granular bed between said walls, a bottom outlet door for the discharge of said bed from the partition into one of said compartments, and means to control the operation of said door.

8. In a settling apparatus for coal washings, a settling tank, a filtering compartment formed in said tank, said compartment having foraminous walls and a granular filling between the walls, a movable bottom for the space between each pair of walls adapted to discharge the granular filling into said compartment, an elevator working in said compartment, and means to deliver material to be separated into said compartment.

9. In a settling apparatus for coal washings, a settling tank, a partition therein subdividing the tank into clean and dirty water compartments, said partition being formed by spaced foraminous walls, a filtering bed between said walls, a hinged bottom upon which said bed rests and opens to discharge the bed into said dirty water compartments, and rods connected to the free end of the bottom and projecting up above the partition, said arms being adapted to hold the door closed under normal operating conditions.

In testimony whereof we affix our signatures.

EUGENE G. BURKS.
NEENIAN HAYES.

Witness:
NOMIE WELSH.

Copies of this patent may be obtained for five cents each, by addressing the "Commissioner of Patents Washington, D. C."